United States Patent
Watanabe et al.

(10) Patent No.: US 7,143,518 B2
(45) Date of Patent: Dec. 5, 2006

(54) ANGLE DETECTOR WITH SELF-CALIBRATION CAPABILITY

(75) Inventors: Tsukasa Watanabe, Tsukuba (JP); Tadashi Masuda, Tachikawa (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 11/213,704

(22) Filed: Aug. 30, 2005

(65) Prior Publication Data

US 2006/0043964 A1    Mar. 2, 2006

(30) Foreign Application Priority Data

Aug. 31, 2004  (JP) .............................. 2004-253252
Aug. 3, 2005   (JP) .............................. 2005-225441

(51) Int. Cl.
*G01B 21/22*    (2006.01)

(52) U.S. Cl. .................................. 33/1 PT; 702/163

(58) Field of Classification Search ................. 33/1 N, 33/1 PT, 534, 706, 707, 708; 73/1.75, 1.79; 702/155, 163

See application file for complete search history.

(56) References Cited

U.S. PATENT DOCUMENTS

| | | | | |
|---|---|---|---|---|
| 4,449,191 A | * | 5/1984 | Mehnert | .................. 33/1 PT |
| 4,530,155 A | * | 7/1985 | Burkhardt et al. | ............. 33/707 |
| 5,301,434 A | * | 4/1994 | Imaizumi | ..................... 33/1 N |
| 6,828,783 B1 | * | 12/2004 | Schroter et al. | ............ 33/1 PT |
| 6,928,386 B1 | * | 8/2005 | Hasser | ....................... 702/163 |
| 2004/0107586 A1 | * | 6/2004 | Nakamura et al. | .......... 33/1 PT |

FOREIGN PATENT DOCUMENTS

| | | |
|---|---|---|
| JP | 10-300053 | 11/1998 |
| JP | 2003-262518 | 9/2003 |

\* cited by examiner

*Primary Examiner*—G. Bradley Bennett
(74) *Attorney, Agent, or Firm*—Oblon, Spivak, McClelland, Maier & Neustadt, P.C.

(57) ABSTRACT

An angle detector with self-calibration capability has a number of first scale read heads and one second scale read head around the periphery of a single scale disk and includes means for performing self-calibration by determining measurement differences between the second scale read head and the individual first scale read heads and calculating the average thereof.

3 Claims, 8 Drawing Sheets

ANGLE DETECTOR WITH SELF-CALIBRATION CAPABILITY

BACKGROUND OF THE INVENTION

1. Field of the Invention

This invention relates to an angle detector such as a rotary encoder for detecting rotation angle, particularly to an angle detector provided with self-calibration capability that enables calculation of calibration values for scale lines that include angle data error owing to attachment eccentricity in the use environment, angle detector aging, and the like.

2. Description of the Prior Art

Rotary encoders and similar angle detectors operate on the general principle of using a read head to count scale lines formed at the periphery of a circular disk and output the counted value as angle data. Various devices are in use such as those shown in FIGS. 6 and 7. Since the scale lines of an angle detector are created artificially, they are not exactly equiangular, so that errors occur in the angle data obtained from the positions of the scale lines. The radial straight lines in FIG. 8 represent ideal scale line positions (equiangularly spaced lines) and the radial short broken lines indicate actual scale line positions. A plot of the deviation from the ideal positions is shown in the graph on the right side of FIG. 8.

The points in the graph of FIG. 8 are the calibration values of the angle detector scale lines. The number of scale lines in the drawing is only 36. An actual angle detector has from several thousand to several hundred of thousand scale lines. Among the various methods of calibrating the lines are included a number of methods that achieve self-calibration by mutually comparing the scale lines of two angle detectors. These methods enable simultaneous calibration of two previously uncalibrated angle detectors and therefore do not require use of an angle detector of higher-order accuracy. The point of "self-calibration" is that even by comparing two unknown angle detectors it is possible to calibration values for both simultaneously.

FIG. 9 shows the Japanese national standard instrument for angle measurement which is kept in the inventors' Institute. It is an instrument for calibrating an angle detector located inside the angle measurement instrument and an angle detector to be calibrated positioned thereabove by the self-calibration method. The self-calibration method used is the equal division averaged method.

A simplified version of the equal division averaged method will be briefly explained with reference to FIG. 10. The difference between the angle graduation signal of one of multiple first scale read heads 12, 12 . . . installed in a first angle detector 11 and the angle graduation signal of a second read head 14 installed in a second angle detector 13 located above the first angle detector 11 is measured (difference Sa1). Next, the difference between the angle graduation signal of an adjacent first scale read head 12 in the first angle detector 11 and the second read head 14 in second angle detector 13 (difference Sa2) is similarly measured. The angle graduation signal differences between the remaining first scale read heads 12 are similarly read and the average value SaAV of the measured differences (Sa1, Sa2, Sa3, Sa4, Sa5) is calculated and, optionally, the value of Sa1−SaAV is calculated. A calibration curve for the second angle detector 13 can then be obtained from either of these values. When five first scale read heads 12 are installed, they are disposed at angular spacing equal to one-fifth of a full circle (360 degrees). When N number of first scale read heads 12 are installed, they are equiangularly spaced at 1/N of a full circle.

JP-A 2003-262518 teaches incorporation of self-calibration capability in a single angle detector. The angle detector uses the multi-reproduction head method of self-calibration. JP-A HEI 10-300053 teaches size reduction of an angle detector of the type shown in FIG. 10.

As shown in FIG. 10, the rotational shafts of the first angle detector and the second angle detector to be calibrated are coaxially coupled by a coupling 15. However, the coaxiality is generally not perfect. Namely, some amount of eccentricity is present that cannot be neglected. The effect of the axial eccentricity is numerically calculated from the calibration value and the effect obtained therefrom is subtracted to obtain a calibration such as shown in FIG. 8. However, when the calibrated angle detector is detached and installed in the instrument in which it is actually used, its rotational shaft is coaxially coupled with the rotational shaft of the instrument by means of a similar coupling. At this time, the amount of eccentricity and the effect thereof cannot be estimated.

The calibration curves of FIG. 11 were plotted using actual data obtained for the angle detector of FIG. 7. Curve A represents the amount of deviation of the scale lines of the angle detector from the ideal scale line positions. The curve looks continuous owing to the large number of scale lines (18,000). Curve B is a calibration curve measured for the eccentricity with respect to the mating axis (axis of the angle detector in the calibrator). Curve C represents the effect of the eccentricity. The curves are interrelated such that Curve C+Curve A=Curve B. When the angle detector is installed in an instrument for use, the effect of eccentricity corresponding to Curve C cannot be detected. Moreover, the instrument shown in FIG. 10 has a problem in that its structure limits the amount of size reduction possible.

The object of the present invention is therefore mainly to provide an angle detector with self-calibration capability which avoids occurrence of error owing to coupling with the rotational shaft of the angle detector in a calibrator by enabling calculation of calibration values for scale lines that include angle data error owing to the effect of eccentricity of the angle detector itself and factors such as angle detector aging, thereby ensuring accurate calibration at all times, and which can be reduced in size.

SUMMARY OF THE INVENTION

The present invention achieves the aforesaid object by providing an angle detector with self-calibration capability that is an angle detector equipped with scale read heads around the periphery of a scale disk fastened to a rotary shaft, which angle detector with self-calibration capability comprises a number of first scale read heads and one second scale read head located around the periphery of the scale disk, and means for performing self-calibration by determining measurement differences between the second scale read head and the individual first scale read heads and calculating the average thereof. For performing these operations, this invention provides a system, such as shown in FIG. 12, for calculating the average value of the differences between the angle signal of a reference head and the angle signals of heads 1 to $N_H$.

In another aspect, this invention provides the angle detector with self-calibration capability of the aforesaid configuration, wherein the second scale read head is installed among the first scale read heads spaced equidistantly around the periphery of the scale disk.

In another aspect, this invention provides the angle detector with self-calibration capability of the aforesaid configuration, wherein the second scale read head is installed at the location of one of the first scale read heads spaced equidistantly around the periphery of the scale disk to replace the same.

This invention can provide an angle detector with self-calibration capability, whose self-calibration capability enables detection of scale line calibration values and error and the like owing to rotational shaft coupling, which enables calibration work to be readily performed as required in the course of use of the angle detector, without need for an operation for coupling the rotational shaft, and which is therefore able to perform accurate measurement stably over a long period.

DESCRIPTION OF THE PREFERRED EMBODIMENTS

Figure 1:
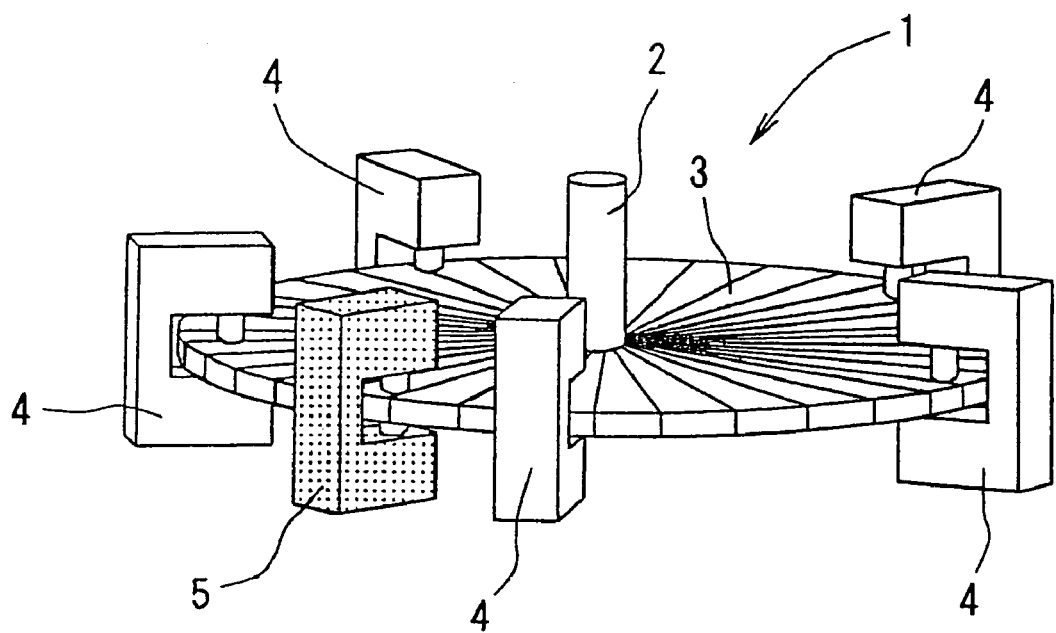
FIG. 1 is a perspective view of a first embodiment of the angle detector with self-calibration capability according to the present invention.
Figure 10:
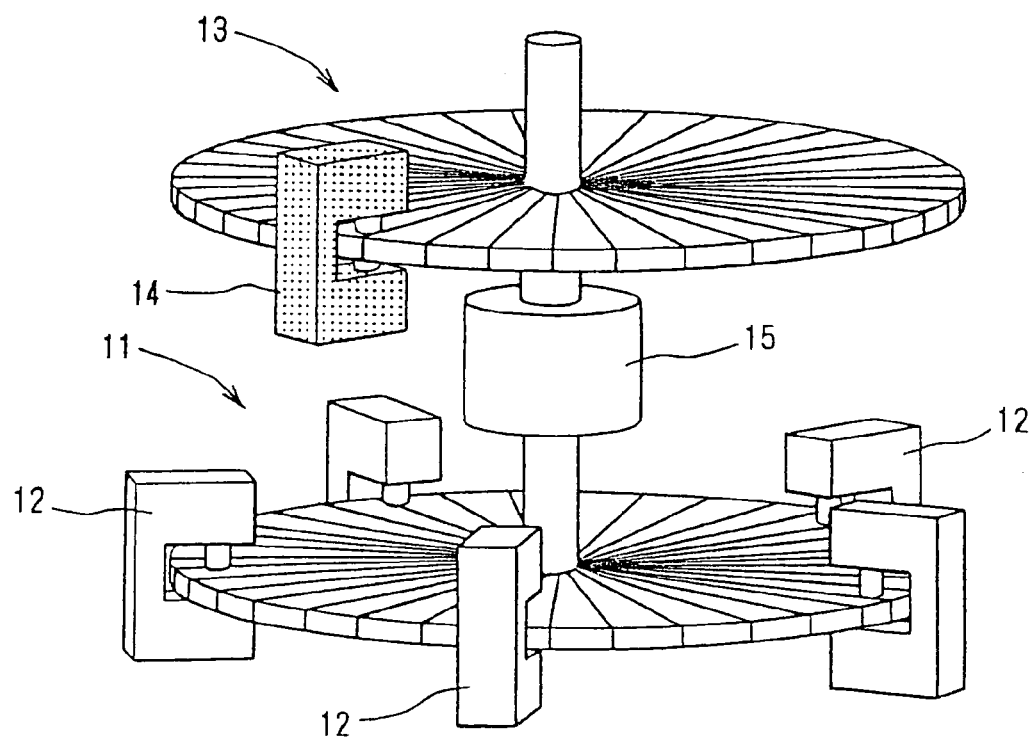
FIG. 10 is a perspective view for explaining an angle detector calibrator according to the prior art.
Figure 11:
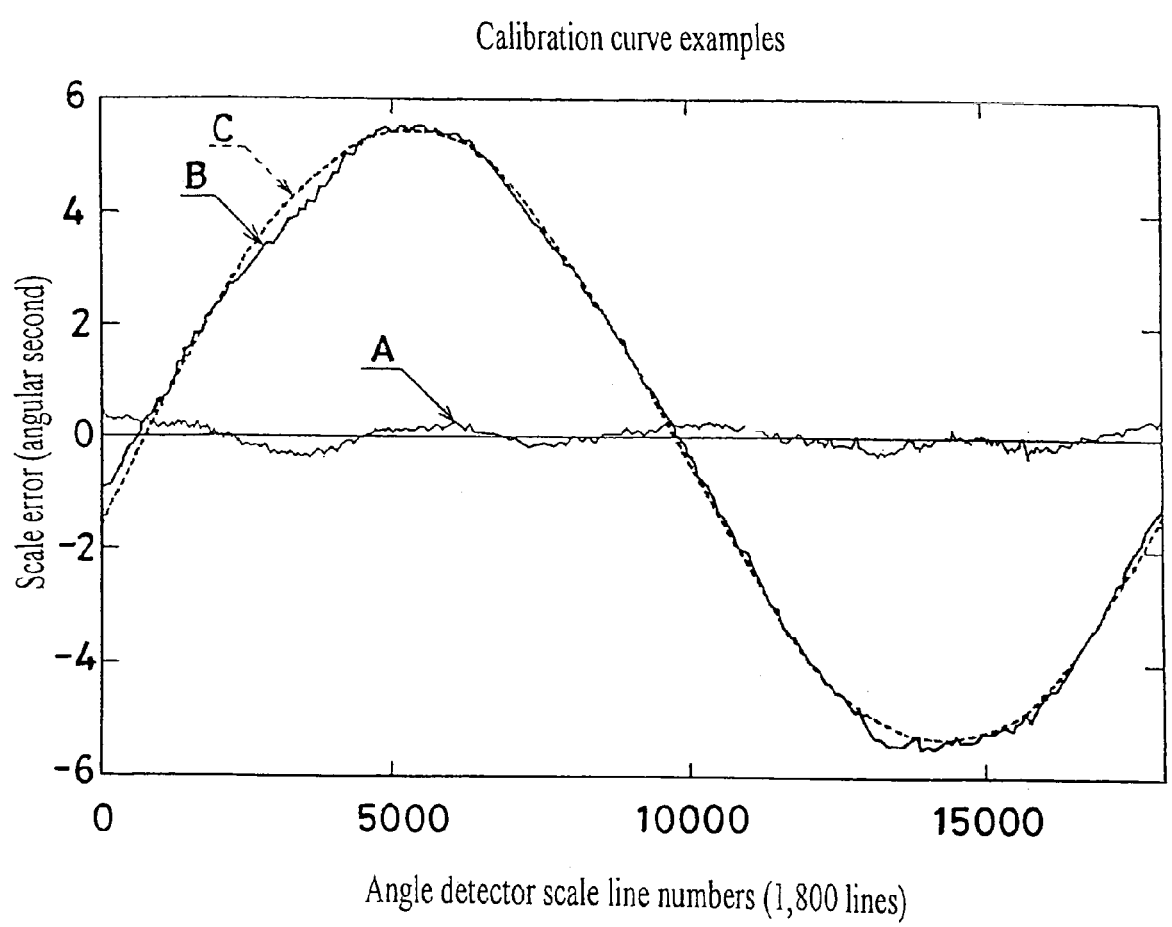
FIG. 11 is a graph representing data generated during calibration using the calibrator of FIG. 10.
Figure 12:
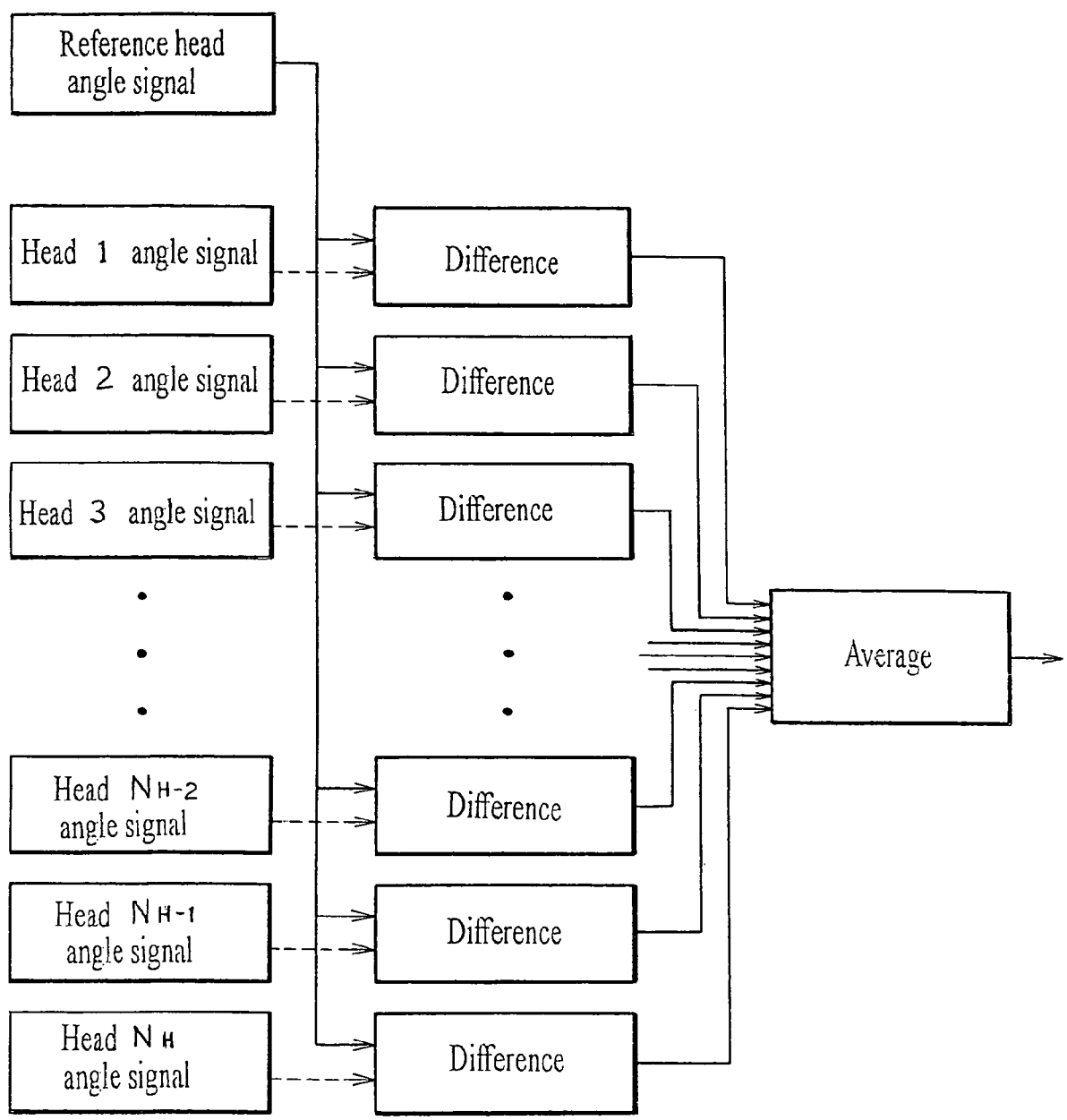
FIG. 12 is a diagram for explaining the operation for calculating the average value of the differences between the angle signal of a reference head and the angle signals of heads 1 to $N_H$ in the present invention.

This invention is directed to enabling calibration of scale lines that takes into account factors heretofore not detectable after attachment to the instrument in which the angle detector is used, such as axis eccentricity caused by the attachment and aging. This was achieved in an angle detector equipped with scale read heads around the periphery of a scale disk fastened to a rotary shaft by providing a number of first scale read heads and one second scale read head around the periphery of the scale disk and performing self-calibration by determining measurement differences between the second scale read head and the individual first scale read heads and calculating the average thereof FIG. 1 shows that the first scale read heads and the second scale read head of FIG. 10 are spaced around the periphery of a single angle detector scale disk. In other words, this angle detector, designated by 1 in the drawing, has a second scale read head 5 installed between among first scale read heads 4, 4 . . . (five of which are shown in the drawing) spaced equidistantly around the periphery of a scale disk 3 that rotates around a rotational shaft 2.

The output signals of the first scale read heads 4 are compared with that of the second scale read head 5 in the manner illustrated in FIG. 10, thereby enabling the single angle detector to calibrate itself.

More specifically, where the first scale read heads are designated A1, A2, A3 . . . A$N_H$ and the second scale read head serving as a reference head is designated B1, the scale angle signals $B_i$ and $A_{i,j}$ detected by these heads can be expressed by the following equations.

$$B_i = b_i$$

$$A_{i,j} = a_{i+(j-1)N_G/N_H}$$

$N_G$: Total number of scales on a rotary encoder $N_H$: Total number of heads j: Head number, j=1, 2, . . . , $N_H$ i: Scale number, i=1, 2, $N_G$ The differences $SA_{ij}$ between the angle signal $b_i$ output by the reference head B1 and the angle signals $A_{i,j}$ and the average $SAV_j$ thereof can be expressed by the following equations.

$$SA_{i,j} = B_i - A_{i,j} = b_i - a_{i+(j-1)N_G/N_H}$$

$$SAV_i = \frac{1}{N_D} \sum_{j=1}^{N_D} SA_{i,j}$$

$$= b_i - \frac{1}{N_D}\left(a_i + a_{i+N_G/N_D} + a_{i+2N_G/N_D} + \ldots + a_{i+(j-1)N_G/N_D}\right)$$

The angle detector according to this embodiment does not require a two-tier structure like that illustrated in FIG. 10 and can therefore be made proportionally smaller. Moreover, the angle detector does not require rotational shaft coupling. This makes it possible to avoid the error caused by rotational shaft coupling mentioned earlier and thus enables accurate calibration. When the angle detector of this embodiment is incorporated in a machine that uses it to perform rotation angle measurement, self-calibration is possible without detaching the angle detector form the rotational shaft of the machine during the calibration. This is a particularly advantageous feature because it enables calibration of angle data error owing to eccentricity and the like, thereby ensuring accurate rotation angle measurement stably over a long period.

Figure 2:
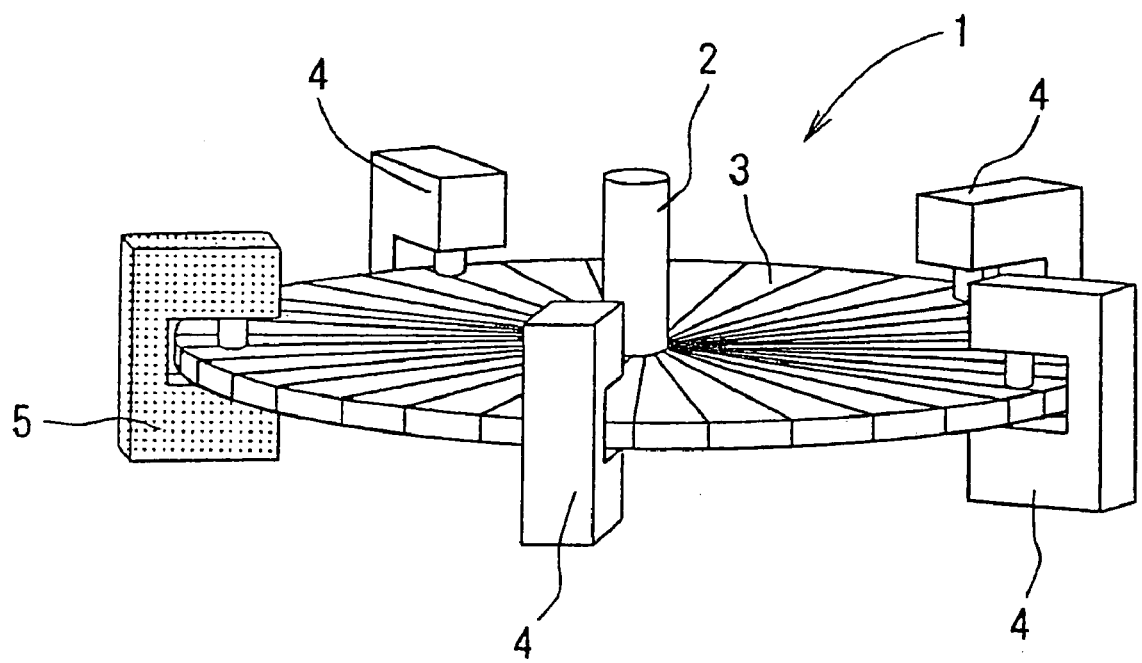
FIG. 2 is a perspective view of a second embodiment of the angle detector with self-calibration capability according to the present invention

The degree to which the size of the angle detector shown in FIG. 1 can be reduced is limited because when the second scale read head 5 is installed among the first scale read heads 4, 4 . . . , inter-head interference is apt to arise if the size of the angle detector scale disk is made too small. Therefore, as shown in FIG. 2, in the second embodiment, one of the first scale read heads is made to assume the role of the second scale read head. In other words, the second scale read head 5 is installed at the location of one of the first scale read heads 4, 4 . . . spaced equidistantly around the periphery of the scale disk 3 to replace the same.

In this arrangement of the scale read heads, as in the first embodiment, where the first scale read heads are designated A1, A2, A3, . . . , A$N_H$, and the second scale read head serving as a reference head is designated B1, the scale angle signals $B_i$ and $A_{i,j}$ detected by these heads can be expressed by the following equations.

$$B_i = b_i$$

$$A_{i,j} = a_{i+(j-1)N_G/N_H}$$

$N_G$: Total number of scales on a rotary encoder
$N_H$: Total number of heads
j: Head number, j=1, 2, ..., $N_H$
i: Scale number, i=1, 2, , $N_G$ Since $B_i = A_{i,j}$ when the first head is considered the reference head, the differences $SA_{ij1}$ between the angle signal output by the reference head B1 and the angle signals $A_{i,j}$ and the average $SAV_j$ thereof can be expressed by the following equations.

$$Sa_{i,j} = A_{i,1} - A_{i,j} = a_i - a_{i+(j-1)N_G/N_H}$$

$$SAV_i = \frac{1}{N_D} \sum_{j=1}^{N_D} SA_{i,j}$$

$$= a_i - \frac{1}{N_D}(a_i + a_{i+N_G/N_D} + a_{i+2N_G/N_D} + \ldots + a_{i+(j-1)N_G/N_D})$$

Figure 3:
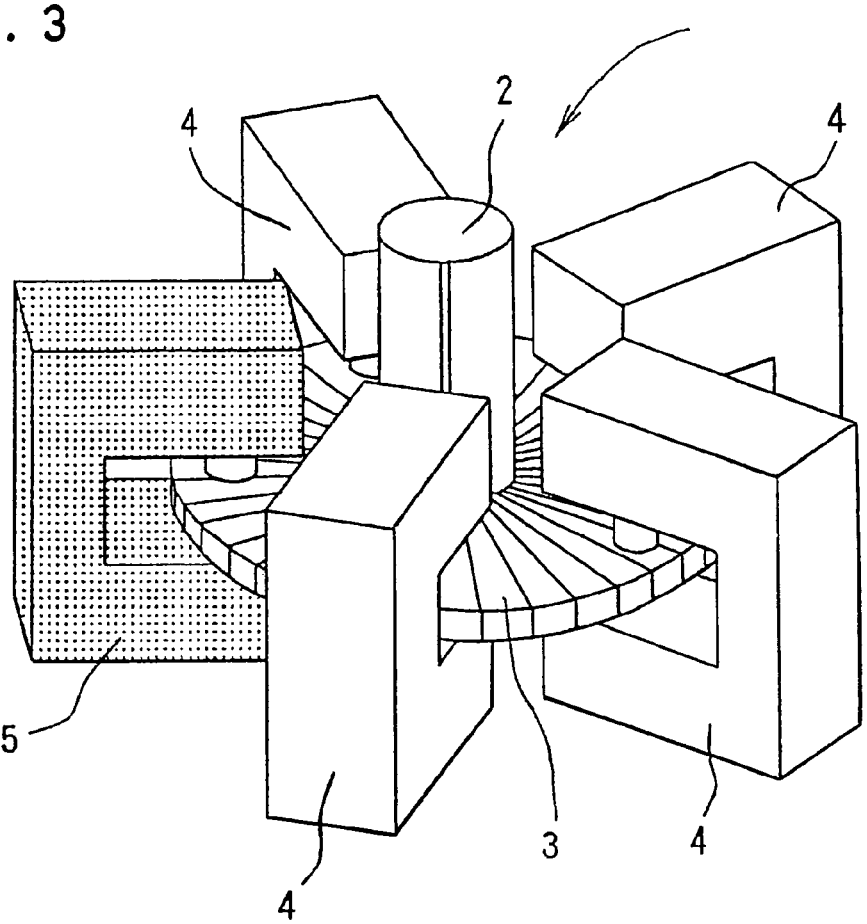
FIG. 3 is a perspective view showing a modification of the second embodiment of the present invention.

As exemplified in FIG. 3, this configuration minimizes the spacing required among the heads, thereby enabling size reduction up to the limit beyond which inter-head interference occurs. Viewed in another way, this means that this embodiment makes it possible to enhance detection accuracy by installing as many first scale read heads 4 as will fit in the space available. Viewed in still another way, it means that the foregoing configuration enables size reduction of the scale disk itself. So the advantageous effects of the configuration are many and various.

Figure 4:
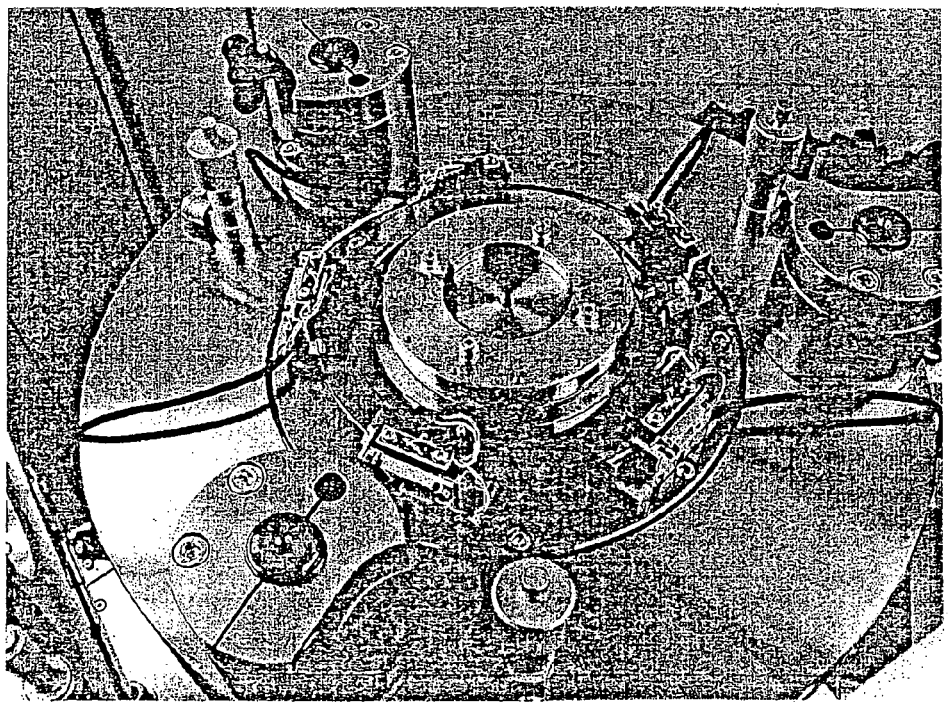
FIG. 4 is a photograph showing a test setup used to ascertain the effectiveness of the present invention.
Figure 7:
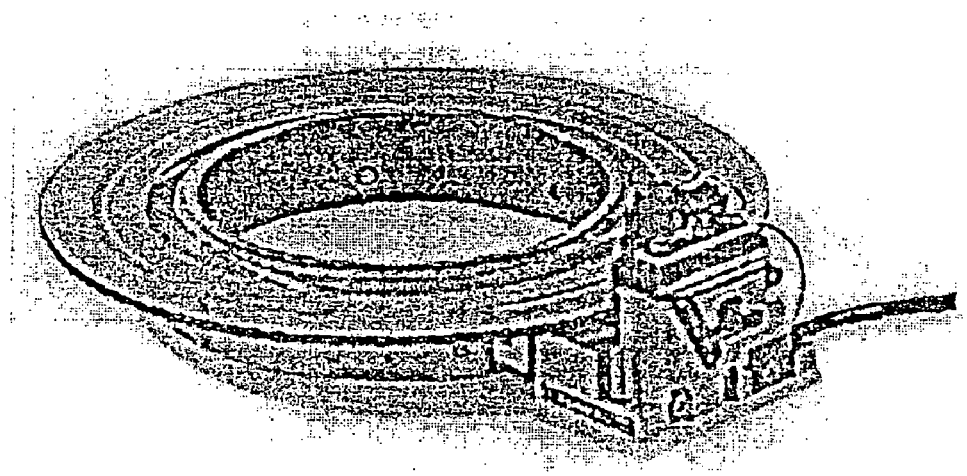
FIG. 7 is a photograph showing another angle detector according to the prior art.
Figure 8:
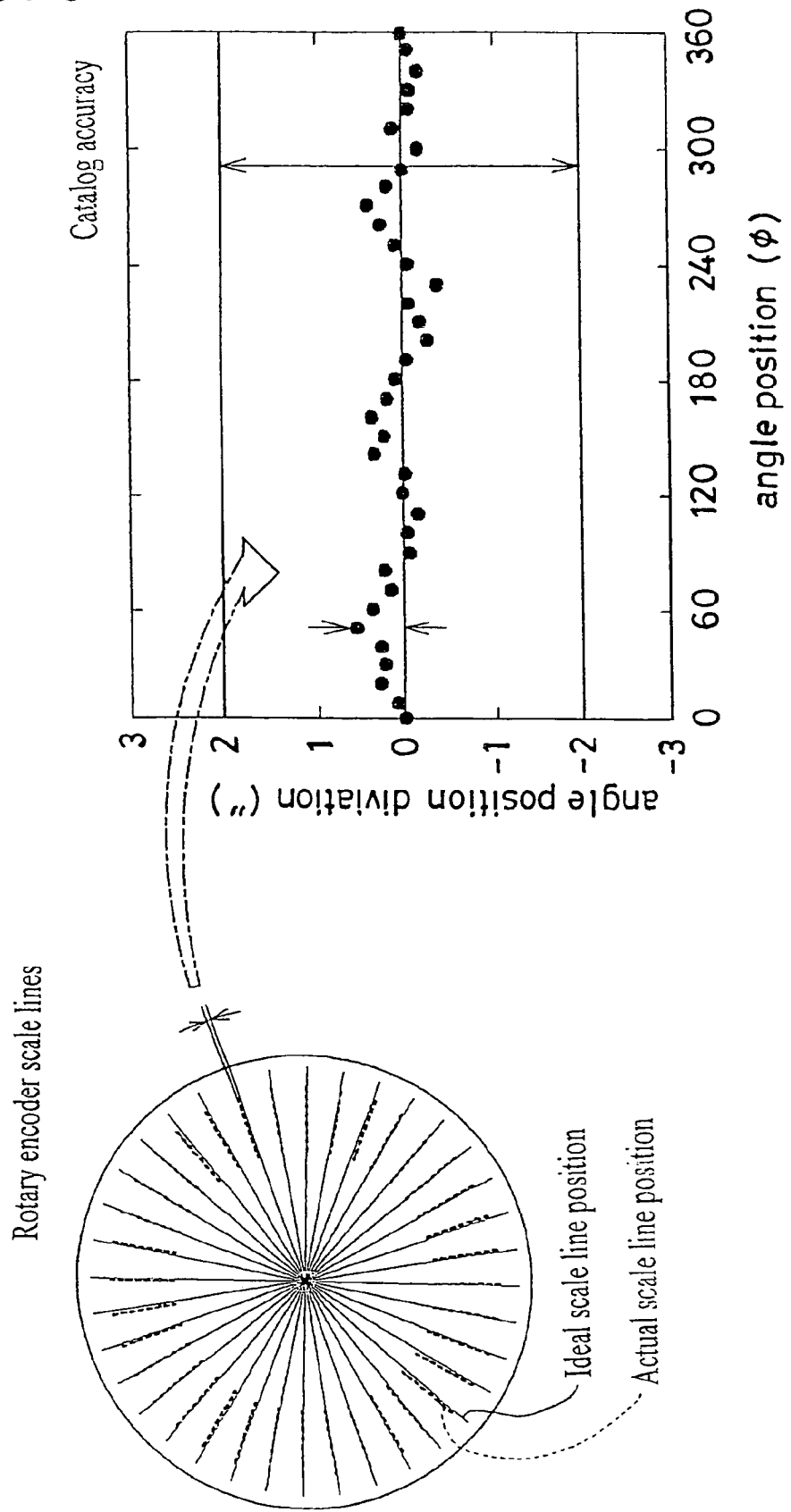
FIG. 8 is a diagram showing the accuracy of an angle detector according to the prior art.
Figure 9:
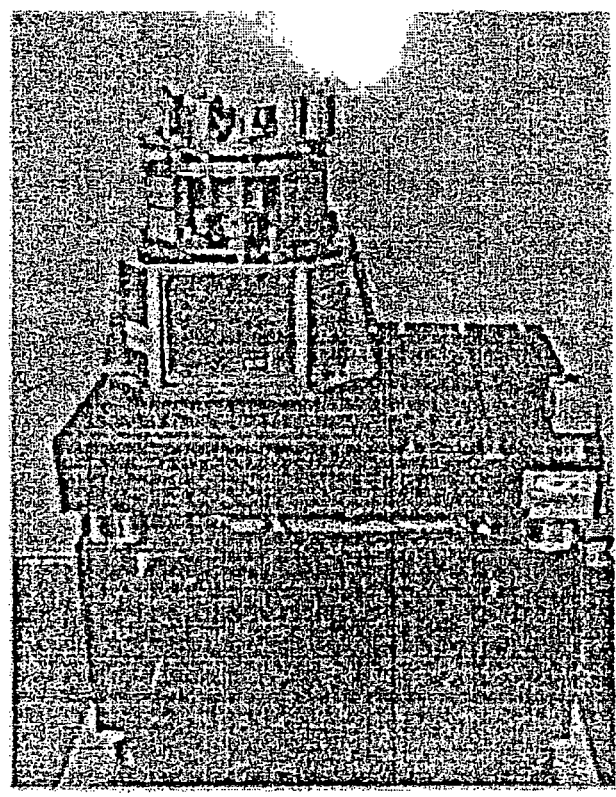
FIG. 9 is a photograph showing the Japanese national standard instrument for angle measurement which is kept in the inventors' Institute.

A test was conducted to ascertain the effectiveness of the foregoing invention in actual application. The setup used for the test is shown in FIG. 4. The Japanese national standard instrument for angle measurement kept in the inventors' Institute (FIG. 9) was used as an angle detector calibrator. The angle detector shown in FIG. 7 was attached to the top of the calibrator. In FIG. 7 there is only one read head, so five (N=5) were installed for performing calibration by the equal division averaged method.

Figure 5:
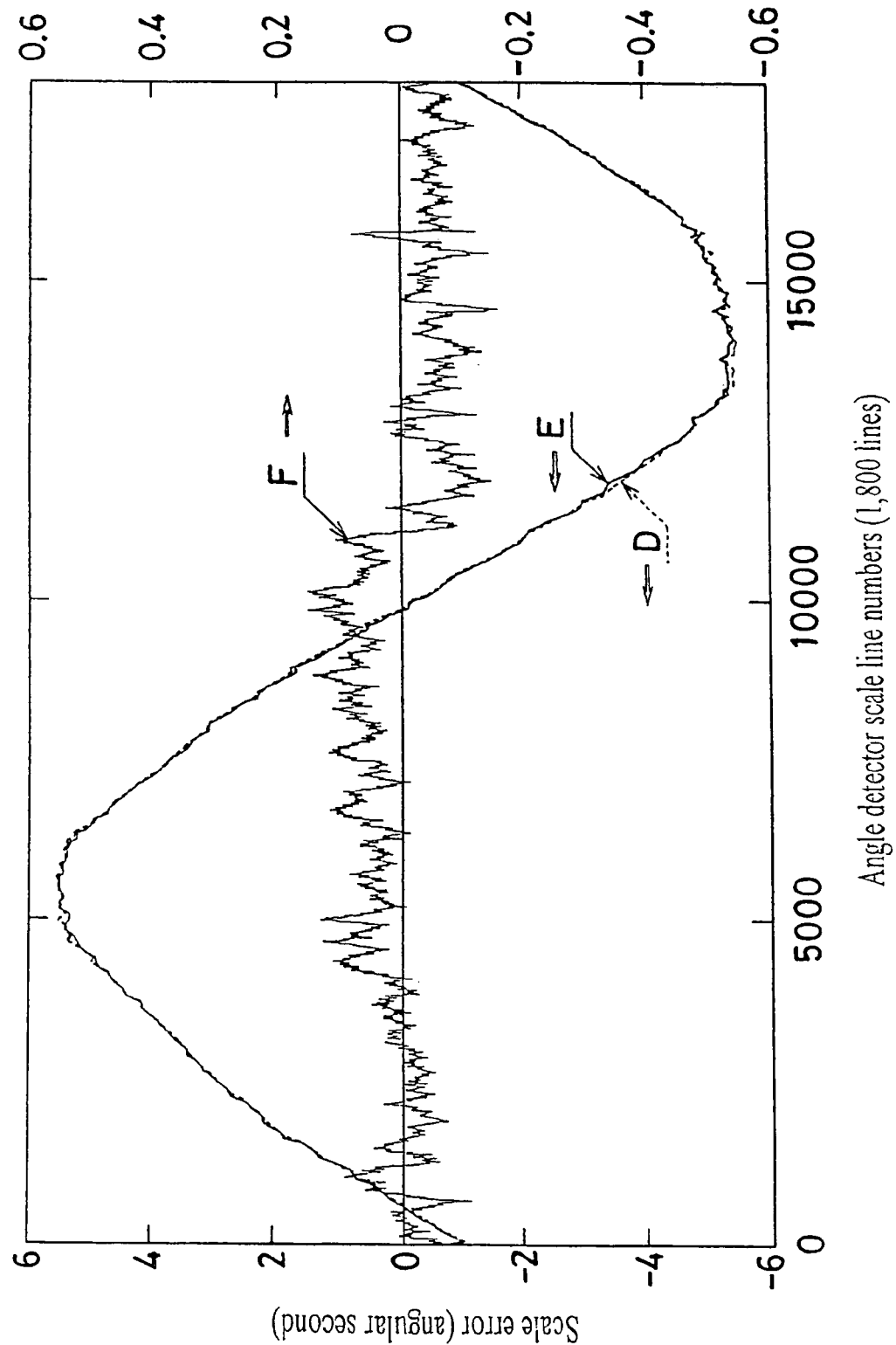
FIG. 5 is a graph showing the results of a test conducted using an angle detector with self-calibration capability according to the present invention.
Figure 6:
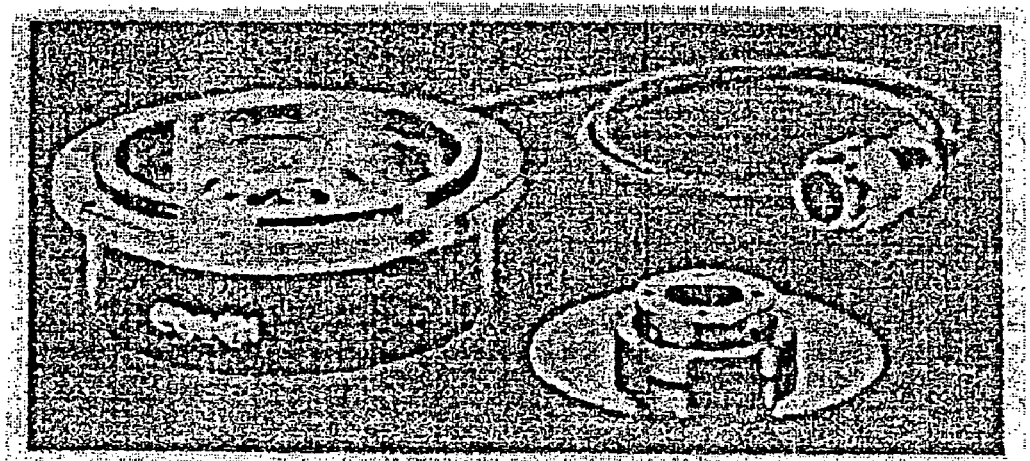
FIG. 6 is a photograph showing an angle detector according to the prior art.

The first curve D in FIG. 5, which is almost completely hidden by the second curve E in the same figure, represents a calibration curve in the case where the Japanese national standard instrument for angle measurement and one of the five heads of the angle detector attached on top are a conventional combination of two angle detectors. The second curve E is a calibration curve obtained using the five heads of only the upper angle detector, without using the standard angle measurement instrument. Both calibration curves show detection of the eccentricity at the time of attachment of substantially the same magnitude. The third curve F represents the difference between the two data sets (scale on right coordinate axis).

Properly speaking, it is the first calibration curve D reflecting the effect of the eccentricity at attachment that should be obtained. Conventionally, however, it has not been possible to obtain such a curve after the user attaches the angle detector to the instrument that uses it. In contrast, this invention overcomes this problem by providing an independent self-calibrating angle detector whose capability extends to eccentricity detection and which is therefore capable of obtaining the calibration curve E in FIG. 5, by itself without using another calibrator.

The equal division averaged method by nature requires another head in addition to the equidistantly spaced heads of the angle detector. However, if one of the equidistantly spaced heads is made to operate instead as the additional head, a still more compact independent self-calibrating angle detector can be realized.

The angle detector with self-calibration capability according to this invention can perform accurate rotation angle detection stably over a long period. It can therefore make a particularly effective contribution to industrial sectors requiring precise rotation angle measurement.

What is claimed is:

1. An angle detector with self-calibration capability that is an angle detector equipped with scale read heads around a periphery of a scale disk fastened to a rotary shaft,
which angle detector with self-calibration capability comprises a number of first scale read heads and one second scale read head located around the periphery of the scale disk, and means for performing self-calibration by determining measurement differences between the second scale read head and the individual first scale read heads and calculating an average thereof.

2. An angle detector with self-calibration capability according to claim 1, wherein the second scale read head is installed among the first scale read heads spaced equidistantly around the periphery of the scale disk.

3. An angle detector with self-calibration capability according to claim 1, wherein the second scale read head is installed at a location of one of the first scale read heads spaced equidistantly around the periphery of the scale disk to replace the same.

* * * * *